US009469568B2

United States Patent
Cangiano et al.

(10) Patent No.: US 9,469,568 B2
(45) Date of Patent: Oct. 18, 2016

(54) COMPOSITE PANEL BASED ON CEMENTITIOUS MORTAR WITH PROPERTIES OF TRANSPARENCY

(75) Inventors: Stefano Cangiano, Torre De Roveri (IT); Aronne Carminati, Medolago (IT)

(73) Assignee: ITALCEMENTI S.P.A., Bergamo (IT)

( * ) Notice: Subject to any disclaimer, the term of this patent is extended or adjusted under 35 U.S.C. 154(b) by 0 days.

(21) Appl. No.: 13/702,178

(22) PCT Filed: Jun. 9, 2011

(86) PCT No.: PCT/EP2011/059591
§ 371 (c)(1),
(2), (4) Date: Dec. 5, 2012

(87) PCT Pub. No.: WO2011/154498
PCT Pub. Date: Dec. 15, 2011

(65) Prior Publication Data
US 2013/0084424 A1 Apr. 4, 2013

(30) Foreign Application Priority Data
Jun. 10, 2010 (IT) .............................. MI2010A1046

(51) Int. Cl.
| | |
|---|---|
| B32B 3/24 | (2006.01) |
| C04B 24/26 | (2006.01) |
| E04C 2/06 | (2006.01) |
| E04C 2/54 | (2006.01) |
| B32B 3/26 | (2006.01) |
| B28B 1/52 | (2006.01) |
| B28B 7/18 | (2006.01) |
| B29C 39/00 | (2006.01) |
| B28B 23/00 | (2006.01) |

(52) U.S. Cl.
CPC ................ *C04B 24/26* (2013.01); *B28B 1/52* (2013.01); *B28B 7/186* (2013.01); *B28B 23/0037* (2013.01); *B29C 39/00* (2013.01); *B32B 3/266* (2013.01); *E04C 2/06* (2013.01); *E04C 2/54* (2013.01); *Y10T 428/24331* (2015.01)

(58) Field of Classification Search
CPC ........................ C04B 24/26; Y10T 428/24331
USPC ........................................................ 428/131
See application file for complete search history.

(56) References Cited

U.S. PATENT DOCUMENTS

| | | | |
|---|---|---|---|
| 3,091,899 A | 6/1963 | Hans Bordlein | |
| 2007/0230209 A1 | 10/2007 | Martin | |
| 2008/0275149 A1* | 11/2008 | Ladely et al. | ................. 521/55 |

FOREIGN PATENT DOCUMENTS

| | | |
|---|---|---|
| DE | 10211804 | 5/2004 |
| EP | 1063364 | 12/2000 |
| EP | 1958926 A1 | 8/2008 |

(Continued)

OTHER PUBLICATIONS

International Search Report of PCT/EP2011/059591 dated Jul. 28, 2011.

*Primary Examiner* — William P Watkins, III
(74) *Attorney, Agent, or Firm* — Abelman, Frayne & Schwab

(57) ABSTRACT

The present invention relates to a composite panel (10) based on cementitious mortar, passed through its entire thickness by a plurality of through openings (11), each of which is filled with a material transparent to light in the form of a preformed plate (12) housed in said opening (11), or formed in said opening, wherein said cement-based mortar contains at least 30 kg/m 3 of fibers selected from one or more of the following types: metallic fibers, steel fibers, glass fibers, polymeric resin fibers. The invention also relates to methods of production of said panel.

22 Claims, 2 Drawing Sheets

(56) References Cited

FOREIGN PATENT DOCUMENTS

| WO | WO9946214 | 9/1999 |
| WO | WO03097954 | 11/2003 |
| WO | WO2006070214 A2 | 7/2006 |
| WO | WO2006070214 A3 | 7/2006 |
| WO | WO2009007765 A2 | 1/2009 |
| WO | WO2009007765 A3 | 1/2009 |
| WO | WO2010066831 | 6/2010 |

* cited by examiner

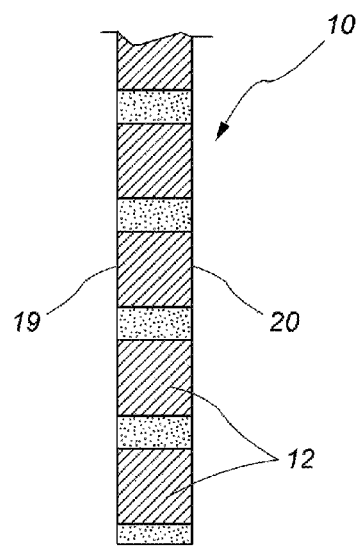
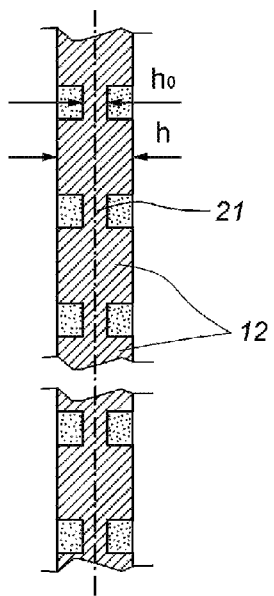
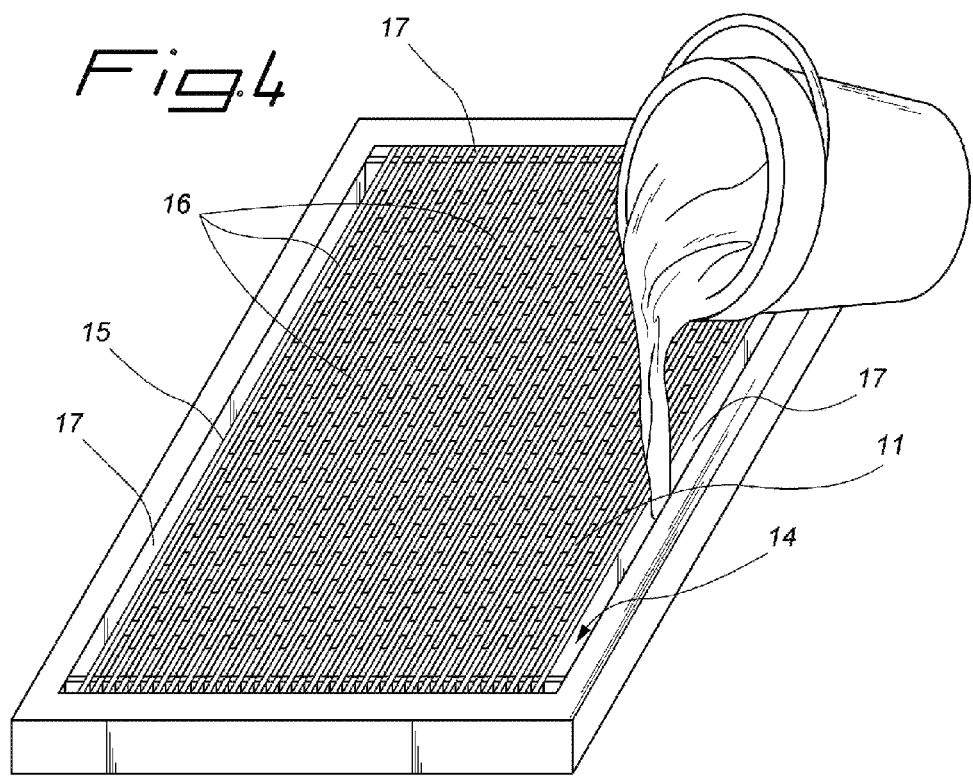

COMPOSITE PANEL BASED ON CEMENTITIOUS MORTAR WITH PROPERTIES OF TRANSPARENCY

CROSS-REFERENCE TO RELATED APPLICATIONS

This application is a National Phase of PCT/EP2011/059591, filed 9 Jun. 2011, which claims the priority of Italian Application No. MI 2010A001046, filed 10 Jun. 2010, the disclosures of which are incorporated herein by reference.

FILED OF THE INVENTION

The present invention relates to a composite panel based on cementitious mortar with properties of transparency to light.

PRIOR ART

WO03097954 describes building blocks of material such as cementitious mortar passed through internally by optical fibres to allow the transmission of light from one side of said block to the other side. In this way it becomes possible to distinguish the outline of objects placed on the back of the block, which is thus commonly described as transparent.

The optical fibres are arranged as the weft in special nets or fabrics and thus inserted during casting of cementitious mortar in the formwork to produce blocks of variable dimensions depending on their intended use. Plates or panels are then obtained from these blocks by sawing, and are finally submitted to grinding and polishing. It is only after these operations that the effect of transparency described above can be obtained.

This effect is, however, dependent on the intensity of the incident light on the block. In fact, in relation to the luminous intensity of the light, an angle of incidence is found, for example already with an inclination of approximately 20° (for a panel thickness of approx. 3 cm), beyond which the transparency effect due to the conveyance of light by the optical fibres gradually decreases, which is an obvious limitation of this technology.

There are other problems connected with the method according to WO03097954, which is rather complex. For positioning the optical fibres, this in fact requires preparation of a special fabric as support to be inserted in successive layers in the formwork, alternating with layers of mortar; then it requires the further phases of sawing into plates of reduced thickness, and polishing, which moreover involves high risk of scrapping of material especially when pieces of considerable size are required, for example square plates with a side of more than a meter.

It must finally be considered that this technique leads to a single type of surface finish, and it is not possible to adapt the appearance of the surface to specific aesthetic and architectural requirements.

For overcoming these problems, Italian patent application MI2008A002190 of the same applicant describes a composite panel based on cementitious mortar, characterised in that it is passed through its entire thickness by a plurality of through openings each of which is filled with a material transparent to light in the form of a preformed plate housed in said opening, or formed in said opening.

In this way, it avoids additional processing stages, simplifying production, scrap during processing and wasting of material, and the desired effect of transparency is obtained even for unfavourable angles of incident light, or of light that is diffused by reflection, having a reduced luminous intensity compared with direct light.

The material transparent to light is a plastic or vitreous material. The plate, which is preformed, or is formed in said opening, is housed in said opening without projecting from it, thus giving rise to a finished panel with various degrees of finish and without projections.

According to said Italian patent application MI2008A002190, a method for producing said panel comprises the stages of:

a) positioning in an orderly manner within a formwork a plurality of elements of said material transparent to light;

b) filling said formwork with said cementitious mortar until said plurality of elements of material transparent to light is completely buried in it without the opposite faces of said elements suitable for constituting the inlet and the outlet of said opening coming into contact with said mortar;

c) hardening said mortar leaving said opposite faces free from said elements of material transparent to light suitable for constituting the inlet and the outlet of said opening, and extracting the finished panel from the formwork.

In a second embodiment, a method for producing a panel comprises the stages of:

d) filling a formwork with said cementitious mortar, positioning in an orderly manner within said formwork a plurality of cores, preferably coated with release agent and light-reflecting film, suitable for constituting said openings until said plurality of cores is completely buried in said mortar without the opposite faces of said cores suitable for constituting the inlet and the outlet of said opening coming into contact with said mortar;

e) during the period of time between the beginning and the end of the mortar setting, extracting said cores from said formwork leaving free said openings thus formed;

f) in the case that the cores have not been coated with reflective film, the further stage of coating said openings with a reflective paint, by, for example, spraying methods;

g) filling said openings with said material transparent to light in its fluid state;

h) allowing the mortar and the transparent material to harden to form said panel, and extracting the finished panel from the formwork;

i) leaving the panel to rest until cured.

Cementitious mortar and transparent material, whether plastic or vitreous, are materials characterised by different thermal and hygrometric properties. In order to avoid the development of dimensional incompatibilities between the elements of plastic or vitreous material and the cementitious mortar in which they are embedded, it is essential that the cementitious mortar is subjected to controlled hygrometric shrinkage and at the same time has high toughness characteristics. In this way it is possible to limit the risk of development of cracking, in particular along the panel edges. This is essentially the technical problem that the present invention proposes to solve in technology for manufacture of the transparent panel as proposed by Italian patent application MI2008A002190.

SUMMARY OF THE INVENTION

To solve this problem, the present invention proposes a composite panel based on cementitious mortar, passed through its entire thickness by a plurality of through openings each of which is filled with a material transparent to light in the form of a preformed plate housed in said opening, or formed in said opening, characterised in that said cement-based mortar contains at least 30 kg/m³ of fibres selected from one or more of the following types: metallic fibres, steel fibres, glass fibres, polymeric resin fibres.

Preferably said cement is a cement of class 52.5 R according to the European standard EN 197-1, more preferably of type I.

A cement of class 42.5 R can also be used.

Said fibres can be of a single type or of various types mixed together.

The fibres can be mainly of the metallic type, preferably of steel, more preferably stainless steel.

The fibres can preferably comprise, per m³ of mortar, from 1 to 2 kg of polymeric resin fibres of low elastic modulus, such as polypropylene, more preferably 1.2 kg/m³.

The polymeric resin fibres can comprise resins of high elastic modulus, such as PVA, in amounts between 1 and 3 kg per m³ of mortar, or glass fibres in amounts between 1 and 3 kg/m³.

In a cementitious mortar based on said cement, it was found that such fibres, distributed uniformly according to a minimum critical concentration, are capable of developing an effective action opposing cracking in the plastic phase during shrinkage of the mortar, and increasing the toughness. The polymeric resins of low elastic modulus, such as polypropylene, are suitable in particular for countering the phenomenon of premature cracking in short weathering times.

The fibres can be pre-mixed with the other solid components of the cementitious mortar mix in the dry state, or can be added in the phase of mixing the mortar with water.

Said material transparent to light for filling the through openings of the panel is a plastic or vitreous material. The plate, preformed, or formed in situ in said opening, is housed in said opening without projecting from it, thus obtaining a panel with various degrees of finish.

In a preferred embodiment of the present invention, in the case when the material transparent to light is a suitable plastic material, this is pre-treated by soaking in water to cause it to be soaked to saturation. For this purpose, the preformed plates of plastic material are pre-treated by immersion in water until saturation before they are used in the formwork for forming the panel. The temperature of the water in the soaking bath is preferably between 40 and 50° C. Saturation can be checked by measuring the weight change of the soaked material with a balance having suitable accuracy for the weight of sample considered. For example, for a plate weighing 120 g, a balance to four decimal places is required. The plates of transparent plastic material can be regarded as saturated with water for the purposes of the use envisaged in the present invention when the difference between two successive weighings, performed with an interval of not less than 24 hours, is less than 0.05%.

When saturation is attained, the preformed plates of water-soaked plastic material must be used immediately for forming the panel of cementitious mortar with fibres, as will be described below.

In the embodiment described above, which envisages pre-treatment by soaking with water (between 40-50° C.) of the transparent material before forming the panel, it was found that the plastic material gives up water to the surrounding mortar, thus improving the process of hardening of the mortar and hence the final mechanical characteristics of the finished product.

In one embodiment, the material transparent to light is a plastic material selected from polymethylmethacrylate, epoxy resins, polycarbonate, polystyrene, styrene-acrylonitrile copolymer, polyethylene terephthalate, polypropylene, polyurethane, polyethylene, polyvinylchloride, polyamide, acetal resins, styrene copolymers, thermosetting polymers, epoxy resins, polyesters and vinyl esters, amide resins.

In another embodiment, said material transparent to light can be glass or based on glass.

In one embodiment of the invention, said material transparent to light is in the form of a preformed element that is housed in said opening.

In another embodiment of the invention, said material transparent to light is in the form of an element formed in situ in said opening, for example by casting.

The shape of the openings is variable within a wide range of geometry, and corresponds to the element of material transparent to light: a preferred shape is that of a prism of rectangular section able to receive a corresponding plate or lamina, preformed or obtained by casting.

In one embodiment of the invention, said openings are aligned in a staggered manner along each pair of adjacent parallel rows. Said openings are defined by the dimensions of length, height and thickness. The height (h) of said openings corresponds necessarily to the panel thickness, the length (L) of said openings is preferably between 0.5 and 100 mm, and the thickness of said openings is preferably between 0.5 and 5 mm. Said openings are preferably arranged along parallel lines and the distance between them is between 0.3 and 0.5 times the length (L). In every case the minimum distance between two consecutive openings arranged on the same line must not be less than twice the maximum diameter of the aggregate present in said mortar.

The distance between two lines of parallel, adjacent openings is preferably between 5 and 10 mm, and in any case must not be less than twice the maximum diameter of said aggregate.

For example, for a panel of dimensions 0.5 m×1.0 m and thickness 5 cm and constituted of cementitious mortar with maximum aggregate diameter of 2 mm, assuming a length (L) of the openings equal to 40 mm, the distance between two consecutive openings arranged on the same line is 15 mm, while the distance between two consecutive lines parallel to one another is equal to 5 mm.

Preferably said material transparent to light is treated with a coating having properties of reflection of light, for example a ceramic-based reflective paint in acrylic emulsion or in epoxy emulsion for increasing the cohesion of the system.

Transmission of light can be optimised with a suitable surface means, such as a film, having light-reflecting characteristics and interposed between the transparent material and the opening where it is housed.

The reflective film can be constituted, for example, of ceramic-based reflective paint. The reflective film can be applied directly on the preformed elements of transparent material or, in the case of elements of transparent material obtained by casting, can be applied on the walls of the openings before casting. The film can be applied by a spraying technique on the preformed elements of transparent material or on the inside walls of the openings by formation of the light-reflecting film on cores used for forming the openings. In that case the surface of the core must be treated beforehand with a suitable release agent to ensure adhesion of said light-reflecting film to the surfaces of the opening and not of the core. If said material transparent to light is in the form of a preformed element, for example a plate or lamina, obtained by cutting from a plate of larger dimensions, cutting must be carried out by techniques that guarantee a roughness of the cut surface that does not limit optical transmission. Laser cutting, for example, is suitable for this purpose.

The present invention also relates to methods of forming said panel. In a first embodiment, a method for producing a panel comprises the stages of:

a) positioning in an orderly manner within a formwork a plurality of elements of said material transparent to light, optionally soaked with water if realized in suitable plastic material;

b) filling said formwork with said cementitious mortar loaded with said fibres, until said plurality of elements of material transparent to light is completely buried in it without the opposite faces of said elements suitable for constituting the inlet and the outlet of said opening coming into contact with said mortar, optionally completely coating the bottom of said formwork with a layer of unwoven material or equivalent sealing means, coupled to PVC or silicone rubber;

c) hardening said mortar leaving said opposite faces free from said elements of material transparent to light suitable for constituting the inlet and the outlet of said opening, and extracting the finished panel from the formwork.

In a second embodiment, a method for producing a panel comprises the stages of:

d) filling a formwork with said cementitious mortar loaded with said fibres, positioning in an orderly manner within said formwork a plurality of cores, preferably coated with release agent and light-reflecting film, suitable for constituting said openings until said plurality of cores is completely buried in said mortar without the opposite faces of said cores suitable for constituting the inlet and the outlet of said opening coming into contact with said mortar;

e) during the period of time between the beginning and the end of the mortar setting, extracting said cores from said formwork leaving free said openings thus formed;

f) in the case that the cores have not been coated with reflective film, the further stage of coating said openings with a reflective paint, by, for example, spraying methods;

g) filling said openings with said material transparent to light in its fluid state;

h) allowing the mortar and the transparent material to harden to form said panel, and extracting the finished panel from the formwork;

i) leaving the panel to rest until cured.

BRIEF DESCRIPTION OF THE DRAWINGS

For better understanding of the characteristics and advantages of the invention, some non-limiting examples of practical application thereof are described below, referring to the appended drawings.

FIG. 3 shows a cross-sectional view according to line III-III in FIG. 1, partial and enlarged.

FIG. 4 shows schematically a perspective view of one phase of one of the methods for producing the panel of FIG. 1.

FIG. 5 shows a cross-sectional view, similar to that in FIG. 3, of one embodiment of the invention.

DETAILED DESCRIPTION OF THE INVENTION

Referring to FIGS. 1 to 4, a concrete panel 10, constituted of cementitious mortar as described with reference to FIG. 4, is passed through its entire thickness by a plurality of through openings 11 in each of which material transparent to light is present.

In the example, said material transparent to light is in the form of a plurality of elements constituted of plates 12 of PMMA, preformed and housed in said openings using the method of forming described hereunder with reference to FIG. 4. In the example shown, plates 12 of PMMA were submitted to pre-treatment of soaking by immersion in water at 45° C. until saturation.

Figure 1:
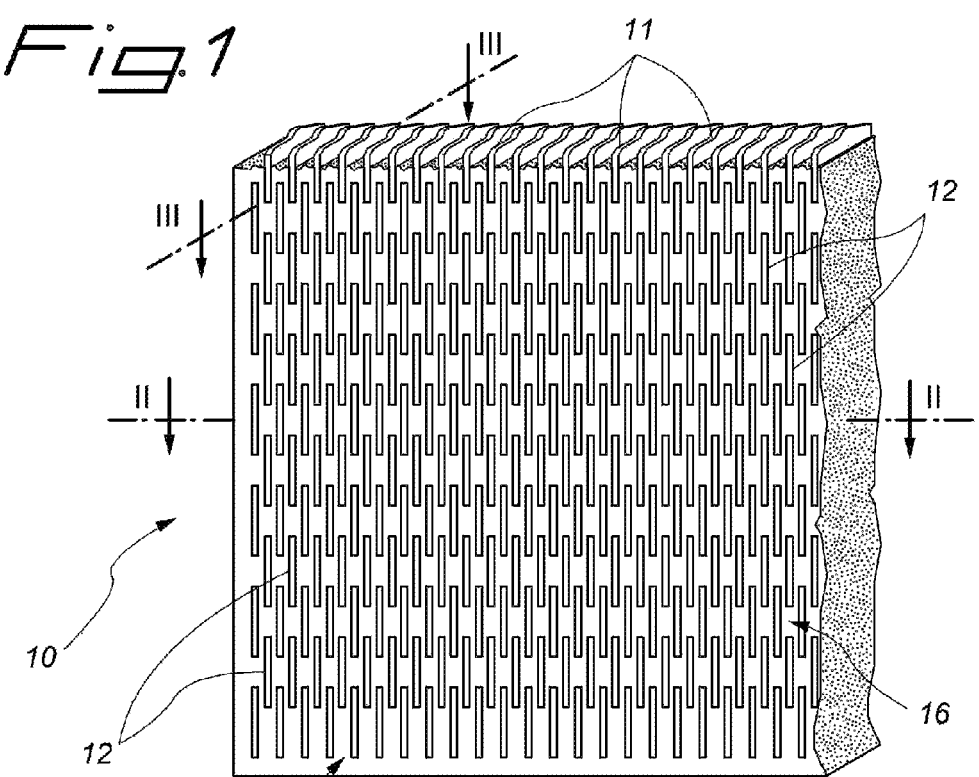
FIG. 1 shows a partial perspective view of a panel according to the invention.
Figure 2:
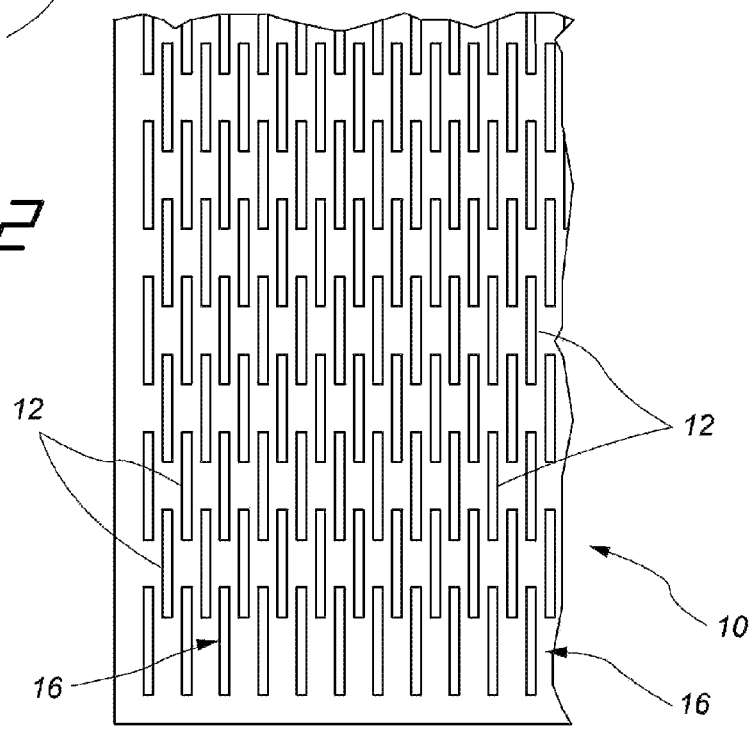
FIG. 2 shows a cross-sectional view according to line II-II in FIG. 1, partial and enlarged.

Said openings 11 are aligned along parallel lines 16 in a staggered manner for each pair of adjacent rows. In this way the slits arranged on alternate rows are positioned side by side, and aligned at the same height in the panel, as shown in FIGS. 1 and 2.

Referring to FIG. 4, a formwork 13 was prepared by completely coating the bottom 14 thereof with a layer of compressible material, compatible with mortar and PMMA, for example unwoven material, for the purpose of preventing backflow and adhesion of the mortar on the section of transparent plates. Said compressible material can be coated with a suitable layer of material with defined weft, for example a fabric, for the purpose of obtaining a finish with corresponding surface textures.

A plurality of elements of said material transparent to light is positioned in an orderly manner within the formwork in the form of plates 12, along parallel lines 16 using a frame constituted of parallel movable bars 15 that can thus grip rows 16 of aligned plates 12, kept apart with templates, to hold them firmly in position.

The plates of PMMA are obtained for example by laser cutting from plates of commercial dimensions.

The frame is arranged so as to leave the perimeter 17 of the formwork free from plates 12 to define a corresponding empty frame inside it.

Said formwork is then filled with cementitious mortar, loaded with fibres, pouring it through the outer edge 17 left free from plates, until said plurality of plates 12 of material transparent to light is completely buried in it without the opposite faces 19 and 20 of the plates 12 coming into contact with said mortar, thus remaining free for their function. This is made possible for the face of the plate facing the bottom of the formwork by an action of pressure against said bottom on the unwoven material, which thus provides a seal to prevent infiltration of mortar between the plates in that zone. For the opposite face the level of the poured mortar will be at the maximum so as to be flush with said face of the plate.

The mortar is then left to harden, said opposite faces 19 and 20 of plates 12 remaining free and thus constituting the inlet and the outlet of said corresponding opening 11 which is thus defined in the panel formed, and the finished panel 10 is extracted from the formwork.

For the purpose of reinforcing the composite structure, further embodiments envisage introducing micro-reinforcement along the panel edges, or a suitably shaped reinforcing metal lath can be positioned, with mesh openings fit for receiving said material transparent to light, or a reinforcing lath whose mesh openings are such as not to interfere with the plates already positioned.

In a further embodiment of the invention as shown in FIG. 5, said through openings are such for which said material transparent to light that fills them is formed according to a single element 12 that extends continuously over an entire dimension, for example the height, of panel 10. The dimension (h) of 12 in FIG. 5 corresponds to the thickness of the panel 10 while $h_0 \leq 0.2$ h corresponds to a reduced section 21 of element 12 that defines a gap that can be filled with mortar during forming of the panel.

In that case too, in a first embodiment of the variant said material transparent to light is in the form of an element, preformed, for example, by laser cutting from plates of commercial dimensions, which is housed in a corresponding opening. In a second embodiment of the variant, said material transparent to light is an element formed in said opening for example by casting in suitable moulds.

The elements 12 according to the variant of FIG. 5, which are formed according to a kind of continuous chain of plates, are housed in caissons whose shorter opposite sides are comb-shaped to perform the function of template. These chains of plates can also be placed in tension using suitable means.

EXAMPLE 1

Formulation of the Cementitious Mortar

The method described above is carried out referring to the appended drawings, or the alternative method of forming that is also described above, using cementitious mortar of the type with high fluidity and controlled shrinkage, having the following composition:

| Component | range of applicable values | Value selected in the example |
| --- | --- | --- |
| CEM I 52.5R | 350-450 kg/m³ | 400 kg/m³ |
| Ventilated Calcareous Filler | 200-350 kg/m³ | 250 kg/m³ |
| Aggregate (max. diameter 2 mm) | 1400-1500 kg/m³ | 14650 kg/m³ |
| Ratio w/c | 0.4-0.55 | 0.5 |
| Superfluidising additive | According to the data sheet | According to the data sheet |
| Shrinkage-reducing additive (SRA) | According to the data sheet | According to the data sheet |
| Expanding additive | According to the data sheet | 7-10 kg/m³ |
| Polypropylene fibres (anticracking function in plastic phase) | 1 kg/m³ | 1 kg/m³ |
| Stainless steel fibres 6 mm | 40-50 kg m³ | 45 kg m³ |

The following table gives the granulometry of said aggregate:

| Diameter [mm] | Undersize, % |
| --- | --- |
| 3.15 | 100 |
| 1.0 | 88.0 |
| 0.500 | 74.2 |
| 0.250 | 54.7 |
| 0.125 | 43.7 |
| 0.075 | 38.8 |
| 0.018 | 28.5 |

EXAMPLE 2

Formulation of the Cementitious Mortar

The following quantities are for a mix of volume equal to 500 liters of mortar

| Component | Quantity in 500 l of mortar |
| --- | --- |
| CEM I 52.5 R | 202 kg |
| Filler | 127 kg |
| Silico-calcareous aggregate | 731 kg |
| Fibres of polymeric resins (polypropylene) | 0.5 kg |
| Steel fibres (straight, length 6 mm) | 22.5 kg |

The components described above can be premixed in the factory or can be introduced directly in a mixer, for example of the planetary type.

In the planetary mixer, charged with the dry solid components as above, the following liquid materials are introduced:

| | |
| --- | --- |
| Water | 86.5 kg |
| Superfluidising additive (AXIM Driver 72) | 7.8 kg (2.238 kg of dry matter) |
| SRA additive (Axim Expandex 2000) | 4.0 kg |

The mixer is switched on for 2-3 min and the following is then added:

| | |
| --- | --- |
| Dowlatex 465 SBR additive | 10 kg (5 kg of dry matter) |

Mixing is continued for approx. 30 seconds.

Trapped air must not exceed 4% (determined according to UNI EN 12350-7).

EXAMPLE 3

Technical Data of the Finished Panels

| PHYSICAL AND MECHANICAL CHARACTERISTICS | | |
| --- | --- | --- |
| | | Remarks |
| Dimensions (nominal) | 50 × 500 × 1000 mm | |
| Weight | 50 kg | |
| Transparency | ~18-20% | Understood as % of transparent surface |
| Degradation by atmospheric agents | Degradation was not observed after exposure in the open for more than a year | Company test |
| Mechanical properties in bending | | |
| Elastic limit | 1.92 MPa | Company test |
| Peak tension | 7.70 MPa | " |
| Post-Peak Response | Hardening - Plastic Behaviour | No detachment of material was observed during the post-peak phase |

| CHARACTERISTICS OF THE CEMENTITIOUS MORTAR | | |
| --- | --- | --- |
| Principal components | | |
| | | Principal objectives |
| Cement | 52.5 R Type I | Rapid setting and high strength |
| Sand of controlled granulometry | Siliceous/ Calcareous | Granular compactness |

-continued

| | | |
|---|---|---|
| Stainless steel fibres | | To provide high ductility |
| Polypropylene fibres | | To prevent cracking during initial weathering |
| Additives | | To improve rheology when fresh and reduce phenomena of slow deformation |
| Mechanical properties | | |
| Mechanical strength | 65 MPa | EN 12390- 3 |
| Bending strength | 65 MPa | EN 12390- 5 |
| Elastic modulus | 39000 MPa | UNI 9771 |
| CHARACTERISTICS OF THE TRANSPARENT MATERIAL | | |
| Tensile strength | 65 MPa | ISO 527-1 /-2 |
| Elastic modulus | 3200 MPa | ISO 527-1 /-2 |
| Elongation at break | 3% | ISO 527-1 /-2 |
| Light transmission factor | 92.0% | DIN 5036 |
| Fire resistance | Class B2 | DIN 4102 |
| Resistance to UV radiation | Good | Company test |
| Chemical resistance | Good, to acids and to alkalis | Company test |

As will be understood from the foregoing description and examples, the panel produced according to the present invention is able to achieve all the purposes initially proposed, and in particular of maintaining the fundamental properties sought according to Italian patent application MI2008A002190 of the same applicant, since additional processing stages are avoided simplifying production, scrap during processing and wasting of material, and the desired effect of transparency is achieved even with respect to unfavourable angles of incident light, or of light diffused by reflection, having a reduced luminous intensity compared with direct light.

The finished panel with these fundamental characteristics is, however, improved according to the present invention, in that the cementitious mortar loaded with fibres, distributed uniformly in the mortar according to a minimum critical concentration, is capable of exerting effective action opposing cracking in the plastic phase during shrinkage of the mortar, and increasing the toughness.

In the embodiment described above that envisages pre-treatment by soaking with water of the suitable transparent material before forming the panel, there is also the surprising technical effect according to which not only ideal moistness of the mortar is attained in the hardening phase, but there is improved adhesion between mortar and transparent material in the finished panel.

The invention claimed is:

1. A composite panel based on cementitious mortar, with properties of transparency to light, passed through its entire thickness by a plurality of through openings each of which is filled with a material transparent to light in the form of a preformed plate housed in said opening, or formed in said opening, wherein said mortar based on cement contains at least 30 kg/m³ of a mixture of two types of fibres, a first one selected from the group consisting of metallic fibres and steel fibres, mixed with a second one made of polymeric resin fibers, in a ratio by weight between 40-50 to 1 respectively, such mixture of fibers controlling the hygrometric shrinkage of the mortar and opposing cracking.

2. The panel according to claim 1, wherein that said cement belongs to the class 52.5 R according to the European standard EN 197-1.

3. The panel according to claim 2, wherein that said cement is of type I.

4. The panel according to claim 1, wherein said cement belongs to the class 42.5 R.

5. The panel according to claim 1, wherein said mortar comprises, for every m³ of mortar, from 1 to 2 kg of polymeric resin fibres of low elastic modulus such as polypropylene.

6. The panel according to claim 1 characterized in that said mortar comprises, for every m³ of mortar, polymeric resins of high elastic modulus, between 1 and 3 kg/m³, or glass fibers between 1 and 3 kg/m³.

7. The panel according to claim 1, wherein said material is transparent to light is subjected to a soaking pre-treatment with water.

8. The panel according to claim 7, wherein said water absorbed by said material transparent to light in the soaking pre-treatment equals the maximum quantity absorbable by said material, or saturation quantity.

9. The panel according to claim 1, wherein said material transparent to light is provided with light reflective properties or treated with a coating having light reflective properties.

10. The panel according to claim 1, wherein said material transparent to light is a plastic material.

11. The panel according to claim 10, wherein said material transparent to light is a plastic material selected from the group consisting of polymethylmethacrylate, epoxy resins, polycarbonate, polystyrene, styrene-acrylonitrile copolymer, polyethylene terephthalate, polypropylene, polyurethane, polyethylene, polyvinylchloride, polyamide, acetal resins, styrene copolymers, thermosetting polymers, polyesters and vinyl esters, and amide resins.

12. The panel according to claim 1, wherein said material transparent to light is glass.

13. The panel according to claim 1, wherein said openings are aligned in a staggered manner along parallel rows.

14. The panel according to claim 13, wherein in each of said openings, defined by the three dimensions height, length and thickness, the height (h) corresponds to the thickness of the panel, the length (L) ranges between 0.5 and 100 mm, the thickness ranges between 0.5 and 5 mm, said openings being arranged along parallel lines separated from each other by a distance ranging between 0.3 and 0.5 times the length (L).

15. The panel according to claim 1, wherein it contains an appropriately shaped reinforcing metal lath with mesh openings fit for receiving said material transparent to light.

16. A method for producing a panel according to claim 1 which comprises:
   a) positioning in an orderly manner within a formwork a plurality of elements of said material transparent to light, optionally soaked with water if realized in suitable plastic material;
   b) filling said formwork with said cementitious mortar loaded with said fibres, until said plurality of elements of material transparent to light is completely buried in it without the opposite faces of said elements suitable for constituting the inlet and the outlet of said opening coming into contact with said mortar,
   c) hardening said mortar leaving said opposite faces free from said elements of material transparent to light suitable for constituting the inlet and the outlet of said opening, and extracting the finished panel from the formwork.

17. The method for producing a panel according to claim 16, wherein before said stage a), said plurality of elements of material transparent to light are subjected to a soaking pre-treatment in water until saturation.

18. The method for producing a panel according to claim 16 which comprises:
   d) filling a formwork with said cementitious mortar loaded with said fibres, positioning in a orderly manner within said formwork a plurality of cores suitable for constituting said openings until said plurality of cores is completely buried in said mortar without the opposite faces of said cores suitable for constituting the inlet and the outlet of said opening coming into contact with said mortar,
   e) during the period of time between the beginning and the end of the mortar setting extracting said cores from said formwork leaving free said openings thus formed
   f) in the case that the cores have not been coated with reflective film, the further stage of coating the inside of said openings with a reflective paint, by, for example, spraying methods;
   g) filling said openings with said material transparent to light in its fluid state;
   h) allowing the mortar and the material transparent to light to harden to form said panel, and extracting the finished panel from the formwork;
   i) leaving the panel to rest until cured.

19. The method for producing a panel according to claim 16, wherein the bottom of said formwork is completely coated with a layer of unwoven material or equivalent sealing means, optionally coupled to silicone rubber or PVC.

20. The method for producing a panel according to claim 18, wherein the bottom of said formwork is completely coated with a layer of unwoven material or equivalent sealing means, optionally coupled to silicone rubber or PVC.

21. Method of controlling hygrometric shrinkage and cracking in a composite panel with properties of transparency to light based on cementitious mortar, passed through its entire thickness by a plurality of through openings each of which is filled with a non-cementitious material transparent to light in the form of a preformed plate housed in said opening, or formed in said opening, wherein said mortar is added with at least 30 kg/m$^3$ of a mixture of two-types of fibres: a first one selected form the group consisting of metallic fibres; and steel fibres mixed with a second one made of polymeric resin fibres, in a ratio by weight between 40-50:1, respectively, sufficient to control hygrometric shrinkage and cracking.

22. Method according to claim 21 wherein said non-cementitious material transparent to light is subjected to a soaking pre-treatment with water.

* * * * *